United States Patent
O'Neill et al.

(10) Patent No.: US 6,860,523 B2
(45) Date of Patent: Mar. 1, 2005

(54) TUBE COUPLING

(75) Inventors: Jerry E. O'Neill, Kirkland, WA (US); Charlie Whitney, Rock Island, WA (US)

(73) Assignee: Accor Technology, Inc., Bellevue, WA (US)

(*) Notice: Subject to any disclaimer, the term of this patent is extended or adjusted under 35 U.S.C. 154(b) by 0 days.

(21) Appl. No.: 10/266,935

(22) Filed: Oct. 7, 2002

(65) Prior Publication Data

US 2003/0111840 A1 Jun. 19, 2003

Related U.S. Application Data

(63) Continuation of application No. 09/570,846, filed on May 12, 2000, now Pat. No. 6,464,266, which is a continuation-in-part of application No. 09/216,376, filed on Dec. 18, 1998, now abandoned, which is a continuation-in-part of application No. 09/425,909, filed on Oct. 21, 1999, now abandoned, and a continuation of application No. PCT/US99/30149, filed on Dec. 17, 1999.

(51) Int. Cl.⁷ .................... F16K 51/00; F16L 37/084
(52) U.S. Cl. ................................. 285/340; 285/40
(58) Field of Search .................. 285/39, 40, 340, 285/322, 323; 251/148; 174/65, 55; 403/13, 16, 7, 22

(56) References Cited

U.S. PATENT DOCUMENTS

| | | | | |
|---|---|---|---|---|
| 1,440,207 A | * | 12/1922 | Burns | 285/340 |
| 2,484,192 A | | 1/1949 | Squiller | 285/161 |
| 2,840,395 A | * | 6/1958 | Tarnow | 285/321 |
| 3,135,033 A | | 6/1964 | Jackson | 285/340 |
| 3,204,988 A | * | 9/1965 | Dunton et al. | 285/40 |
| 3,312,484 A | | 4/1967 | Davenport | 285/340 |
| 3,429,596 A | | 2/1969 | Marshall | 285/340 |
| 3,837,687 A | | 9/1974 | Leonard | 285/111 |
| 3,874,709 A | | 4/1975 | MacDonald | 285/104 |
| 3,995,897 A | | 12/1976 | Paskert | 285/340 |
| 4,059,297 A | | 11/1977 | Grahl et al. | 285/340 |
| 4,062,574 A | | 12/1977 | Scholin | 285/340 |
| 4,073,514 A | * | 2/1978 | Pate | 285/149.1 |

(List continued on next page.)

FOREIGN PATENT DOCUMENTS

| | | |
|---|---|---|
| DE | 9415532 | 2/1995 |
| EP | 602498 | 6/1994 |
| EP | 610538 | 8/1994 |
| GB | 1520150 | 2/1978 |
| GB | 2280006 | 1/1995 |
| WO | 97/00314 | 1/1997 |

Primary Examiner—Eric K. Nicholson
(74) Attorney, Agent, or Firm—George C. Rondeau, Jr.; Davis Wright Tremaine LLP

(57) ABSTRACT

A fluid coupling having an outer housing with an internal bore, an O-ring fitted within the bore, a spacer bushing fitted against the O-ring, a gripper ring fitted against the axially outer side of the spacer ring, the gripper ring having axially and radially inwardly protruding circumferentially spaced gripping teeth, the teeth arranged for providing a twist when subjected to simultaneous rearward axial and rotational forces, and an end bushing holding the gripper ring, spacer bushing, and O-ring within the outer housing. A fluid coupling having an outer housing with an internal bore, an O-ring seal fitted within the bore, a spacer bushing fitted against the seal, a first gripper ring fitted against the axially outer side of the spacer ring, a second gripper ring fitted against the O-ring seal, the gripper rings having axially and radially inwardly protruding circumferentially spaced gripping teeth, in one embodiment the teeth arranged for providing a twist when subjected to simultaneous rearward axial and rotational forces, and an end bushing holding the gripper rings, spacer bushing, and O-ring within the outer housing.

33 Claims, 7 Drawing Sheets

U.S. PATENT DOCUMENTS

| | | | | |
|---|---|---|---|---|
| 4,084,843 | A | 4/1978 | Gassert | 285/105 |
| 4,124,235 | A | 11/1978 | Grahl et al. | 285/340 |
| 4,146,254 | A | 3/1979 | Turner et al. | 285/105 |
| 4,181,329 | A | 1/1980 | Helm | 285/3 |
| 4,288,113 | A | 9/1981 | Saulnier | 285/238 |
| 4,324,407 | A | 4/1982 | Upham et al. | 277/27 |
| 4,390,159 | A | 6/1983 | Duncan | 251/148 |
| 4,490,576 | A | 12/1984 | Bolante et al. | 174/65 |
| 4,508,369 | A | 4/1985 | Mode | 285/39 |
| 4,586,734 | A | 5/1986 | Grenier | 285/340 |
| 4,593,943 | A | 6/1986 | Hama et al. | 285/308 |
| 4,613,172 | A | 9/1986 | Schattmaier | 285/340 |
| 4,632,437 | A | 12/1986 | Robson et al. | 285/310 |
| 4,635,975 | A | 1/1987 | Campbell | 285/340 |
| 4,655,486 | A | 4/1987 | Tarnay et al. | 285/340 |
| 4,676,533 | A | 6/1987 | Gerondale | 285/158 |
| 4,717,179 | A | 1/1988 | Haberstock et al. | 285/112 |
| 4,722,558 | A | 2/1988 | Badoureaux | 285/39 |
| 4,747,626 | A | 5/1988 | Hama et al. | 285/308 |
| 4,749,214 | A | 6/1988 | Hoskins et al. | 285/4 |
| 4,777,669 | A | 10/1988 | Rogus | 4/191 |
| 4,875,709 | A | 10/1989 | Caroll et al. | 285/14 |
| 4,890,865 | A | 1/1990 | Hosono et al. | 285/133.1 |
| 4,911,406 | A | 3/1990 | Atwood | 251/148 |
| 5,052,723 | A | 10/1991 | Bartholomew | 285/108 |
| 5,094,467 | A | 3/1992 | Lagabe | 277/207 |
| 5,160,179 | A | 11/1992 | Takagi | 285/340 |
| 5,174,331 | A | 12/1992 | Steudler, Jr. | 137/505 |
| 5,205,568 | A | 4/1993 | Stoll et al. | 277/205 |
| 5,439,258 | A | 8/1995 | Yates | 285/313 |
| 5,496,076 | A | 3/1996 | Lin | 285/110 |
| 5,527,073 | A | 6/1996 | Readman | 285/340 |
| 5,553,901 | A * | 9/1996 | Serot | 285/340 |
| 5,621,191 | A * | 4/1997 | Norris et al. | 174/65 SS |
| 5,681,062 | A | 10/1997 | Fukao et al. | 285/340 |
| 5,695,224 | A | 12/1997 | Grenier | 285/104 |
| 5,722,702 | A | 3/1998 | Washburn | 285/340 |
| 5,782,570 | A * | 7/1998 | Masterson et al. | 403/13 |
| 5,799,985 | A * | 9/1998 | Murphy | 285/38 |
| 6,464,266 | B1 * | 10/2002 | O'Neill et al. | 285/340 |
| 2003/0067170 | A1 * | 4/2003 | Snyder et al. | 285/340 |

* cited by examiner

TUBE COUPLING

CROSS-REFERENCES TO RELATED APPLICATIONS

This application is a continuation of U.S. patent application Ser. No. 09/570,846, filed May 12, 2000 now U.S. Pat. No. 6,464,266 which is a continuation-in-part of U.S. patent application Ser. No. 09/216,376, filed Dec. 18, 1998 now abandoned; and Ser. No. 09/425,909, filed Oct. 21, 1999 now abandoned, and claims the benefit of and is a continuation of PCT/US99/30149, filed Dec. 17, 1999, all now pending, which applications are incorporated herein by reference in their entirety.

TECHNICAL FIELD

This invention pertains to removable couplings of the type for securing a plastic or copper tube by pressing on the tube without the need for welding or solder.

BACKGROUND OF THE INVENTION

U.S. Pat. No. 4,911,406 shows a tube coupling in which a metal or plastic tube can be coupled in a fluid-tight connection to a valve or the like simply by pressing the tube into the coupling. The tube is held into the coupling by a flexible gripper ring having teeth, which bite into the tube to prevent the tube from being pushed out by the fluid pressure in the coupling. The teeth are arranged such that the tube can be removed from the coupling by unscrewing the coupling but cannot be removed simply by axially pulling the tube without rotation of the tube. An O-ring seal is provided to prevent leakage of fluid outside of the coupling around the tube.

One of the advantages of the invention of the U.S. Pat. No. 4,911,406 is that by screwing the tube out of the gripper ring there is minimal damage to the surface of the tube. This then enables other advantageous arrangements of the seal and the gripper ring within the coupling.

With the introduction of softer plastic tubing, such as, polybutylene or PEX [cross-linked polyethylene, plastic] to the plumbing industry, the demands on the holding power of the gripper ring have increased. The softer tubing material can cause the teeth of the gripper ring to gouge grooves in the tubing when the tubing is subjected to high numbers of repeated cycles at higher hydrostatic pressures.

SUMMARY OF THE INVENTION

It is a first improvement of the invention to reverse the position of a gripper ring in the coupling from the position shown in the U.S. Pat. No. 4,911,406. In the embodiments of this invention, the seal, such as an O-ring seal, is arranged axially inward of the gripper ring in the outer housing of the coupling. This is followed by a spacer bushing which holds the ring in place and the gripper ring, with its teeth, is on the axially outer side of the spacer bushing. This enables the detection of a leak caused by inadequately inserting a tube into the O-ring seal. It is particularly advantageous also in the situation of re-piping or replacing a previous metal valve to enable the existing compression ring used with metal vales to fit into a valve using this gripper ring arrangement.

It is a second improvement of the invention of U.S. Pat. No. 4,911,406, to provide two or more gripper rings for increasing the holding power of the rings in the coupling for use with the softer tubing. The two or more gripper rings co-act on the tubing in a synergistic effect distributing the load between them to substantially increase the holding power of the rings in the softer tubing. It is believed that the softness of the tubing allows movement of the teeth in the plastic until the load on the teeth is distributed over the total number of teeth thus increasing the ultimate holding power of the rings.

DETAILED DESCRIPTION OF THE INVENTION

Figure 1:
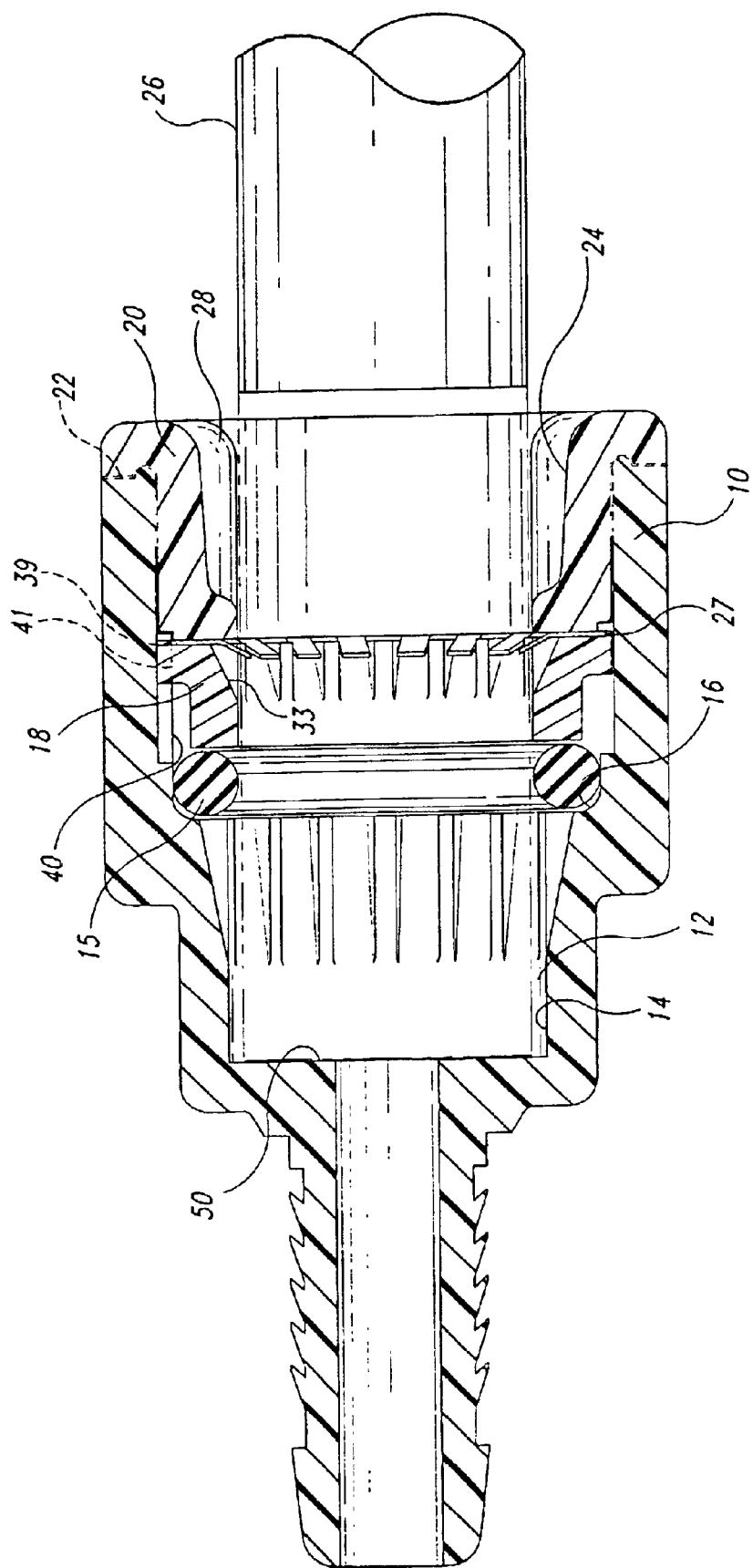
FIG. 1 is an axial section of the coupling embodying the principles of the invention.
Figure 5:
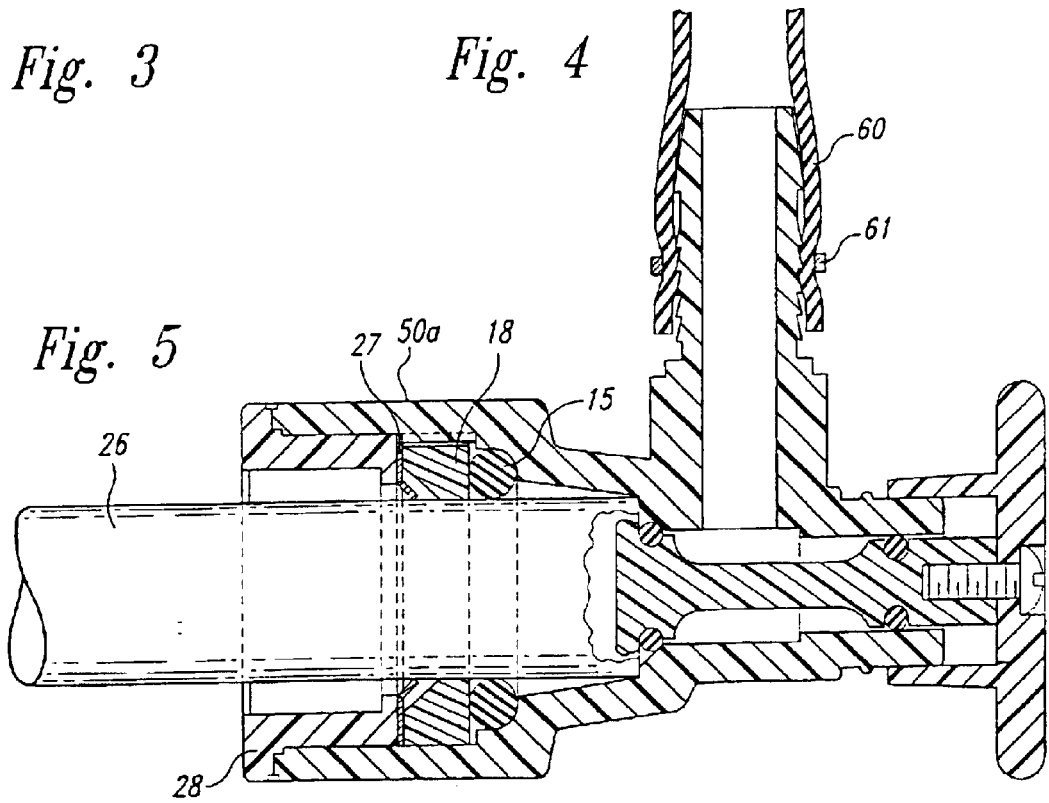
FIG. 5 shows the O-ring seal and gripper ring arrangement of this invention within the valve of the type shown in U.S. Pat. No. 4,911,406.

As best shown in FIG. 1, the unique coupling is shown in one form as a generic coupling but could be a test cap. A test cap, for example, is used in the plumbing industry for checking temporarily on the pressure of a plumbing system to see if all of the joints are free from leaks and that the proper pressure may be maintained. Usually then the test cap is removed and a permanent valve soldered or bonded onto the tube. The many applications for the coupling is further shown generically in phantom lines in FIG. 4, in which the phantom line box is a test cap coupling, a valve, an end unit like a shower-head, a coupling for joining two pieces of tubing together, etc. FIG. 5 shows more specifically the invention for the valve. The details of these different applications are obvious to one of ordinary skill in the art and the details of U.S. Pat. No. 4,911,406 are incorporated herein by reference thereto.

Figure 2:
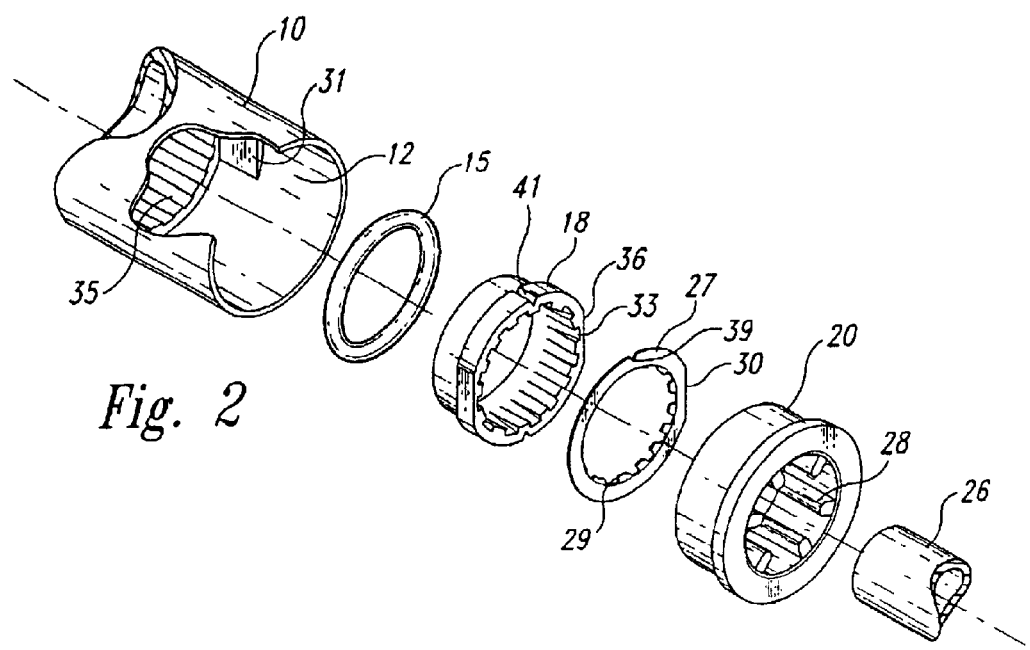
FIG. 2 is an exploded view of the coupling shown in FIG. 1.

In all of the couplings of FIGS. 1–5, the invention includes an outer housing 10 having an inner bore 12 with a side wall 14. The inner bore has a seal support surface 16 against which is fitted a conventional O-ring seal 15. The seal is held in the bore by a spacer bushing 18. The spacer bushing has circumferentially spaced axial grooves 33, as best shown in FIG. 2. A metallic gripper ring 27 is provided with circumferentially spaced axially and radially inwardly protruding teeth 29. The spacer bushing has a flat 36 aligned with a flat 30 on the gripper ring 27. The inside wall of the housing has a protruding flat 31 to receive the flats on the bushing and gripper ring. The gripper ring is also provided with a notch 39 and the spacer bushing provided with a notch 41, which notches engage a protrusion 40 (FIG. 1) on the inside wall 14 of the outer housing 10. The flats on the inner bushing and the gripper ring and the notches are provided to assure proper installation of the gripper ring and inner bushing within the housing.

An end bushing 20 is positioned against the gripper ring and holds the O-ring, spacer bushing, and gripper ring tightly together so that the teeth of the gripper ring extend into the inner bore 12. The end bushing is held within the internal bore of the outer housing 10 by sonic welds 22. The end bushing is provided with guide ribs 28 for guiding a plastic or copper tube 26 into the coupling. The tube end inserted into the coupling is shown in phantom lines in FIG. 1. Inner ribs 35 are provided in the side wall 14 of the internal inner bore 12. In general, the gripper ring is made from a full hard stainless steel, the coupling parts from plastic, such as, acetal, or for larger couplings, metal, and the tubes or pipe made from copper or conventional PVC used in plumbing polybutylene, CPVC, PEX or other metals and plastics used in plumbing.

As best shown in FIG. 1, the coupling is assembled by placing the O-ring against the ring support surface 16, the spacer bushing is aligned with its flat 36 against the flat 31 of the outer housing and slid into place against the O-ring, the gripper ring is then placed against the spacer bushing with its flat 30 aligning the teeth 29 into the grooves 33 of the spacer bushing. Then the end bushing is placed within the outer housing and welded into place by sonic welding 22. For metal couplings, the outer housing can be secured by any suitable permanent attachment such as crimped or interfering threads. When a tube 26 is to be inserted in the coupling or the coupling inserted over a tube, the tube and the coupling are moved axially to one another with the tube engaging the teeth. The teeth extend into the inner bore of the housing a distance further than the outer diameter of the tube 26 so that the teeth are deflected by the tube as the tube and housing are moved axially to one another. This creates an immediate gripping engagement of the teeth even before any fluid pressure is applied in the coupling. The tube is inserted until it tightly engages the end wall 50 of the bore 12. This can be felt by the user of the coupling since the tube can be pushed to move axially, albeit tightly, until the end of the tube stops against the end wall 50 and cannot be pushed any further relative to the outer housing.

The O-ring seal maintains the fluid seal around the tube. The tube cannot be solely axially withdrawn by fluid pressure without destroying the coupling and will maintain quite a high fluid pressure. The tube can be removed by unscrewing the coupling relative to the tube. The teeth 29 in the gripper ring can be manufactured with a slight twist or by using the full hard stainless steel or equivalent material, such as manganese, or composites, and a ring thickness of no greater than about 0.012 inches, preferably 0.008 inches, then the twist can be created by the forces acting on the teeth as the tube 26 is simultaneously rotated and pulled out of the housing. By rotating the tube while pulling, edges of the gripper teeth will move within the grooves 30 causing friction on one edge of the teeth allowing the teeth to twist and the tube screw out of the gripper ring. If the tube is initially not inserted past the gripper ring, or is not inserted through the O-ring seal, leakage will be apparent almost immediately when the pressure is applied to the plumbing system. Thus, an advantage of this embodiment is it gives an immediate visual check on the proper placement of the tube within the coupling or the position of the test cap over the coupling.

Figures 3, 4:
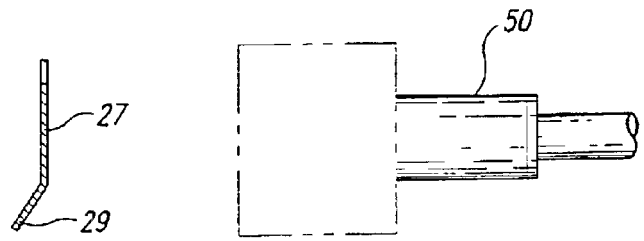
FIG. 3 is a fragmentary section of the gripper ring showing one of the gripper teeth.
FIG. 4 is a generic illustration of what could be a test cap or a valve or other coupling device product embodying the principles of the invention.

FIG. 4 shows a phantom version of a coupling to illustrate that the coupling could be a test cap as shown in FIG. 1, a valve in U.S. Pat. No. 4,911,406, or simply a mirror image of the right side coupling 50 being on the left side to simply join two tubes together.

FIG. 5 shows an embodiment using the valve or housing 50a of U.S. Pat. No. 4,911,406 as the coupling. Another advantageous feature of the invention is illustrated in FIG. 5 by showing that pre-cut lengths of tubing or hose 60 can be bonded and crimped as at 61 or otherwise permanently secured to the valve to provide a complete connection from the plumbing system to an appliance or other plumbing fixture. Thus, installation can be made more economically and faster having a complete pre-cut plumbing connection already made-up and available.

Figure 6:
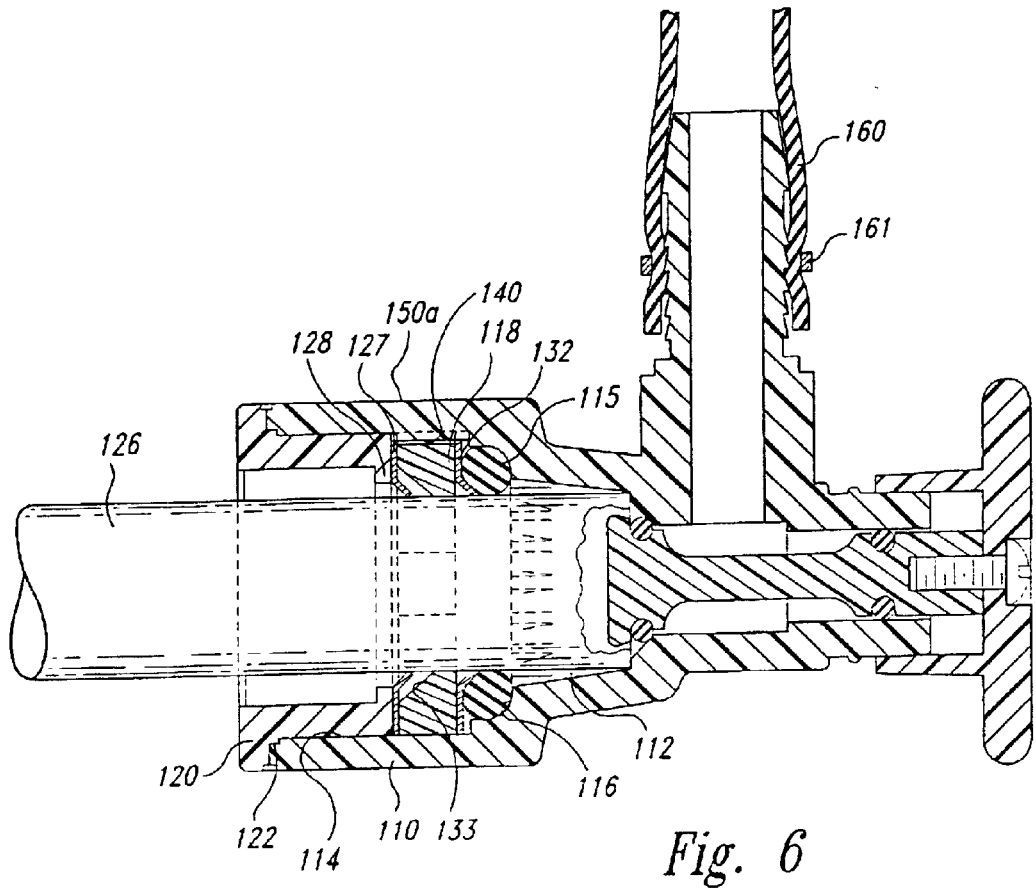
FIG. 6 is an axial section of the coupling embodying the principles of the invention with multiple gripper rings for use, for example, with a valve.

As best shown in FIG. 6, the unique coupling is shown with multiple gripper rings in one form as a valve. However, while a valve has been shown in the embodiment of FIG. 6, this is for illustration purposes only and the coupling can be used for a valve, such as shown in U.S. Pat. No. 4,911,406 or any other use for a coupling. This is shown generically in phantom lines in FIG. 9, in which the phantom line box is a valve, a coupling for joining two pieces of tubing together, a shower head, a tub faucet coupling, or any other use where a soft tubular plumbing material is to be joined to more tubing or to some plumbing fixture. These different applications or uses for the coupling are obvious to one of ordinary skill in the art and the details of U.S. Pat. No. 4,911,406 are incorporated herein by reference thereto.

Figure 7:
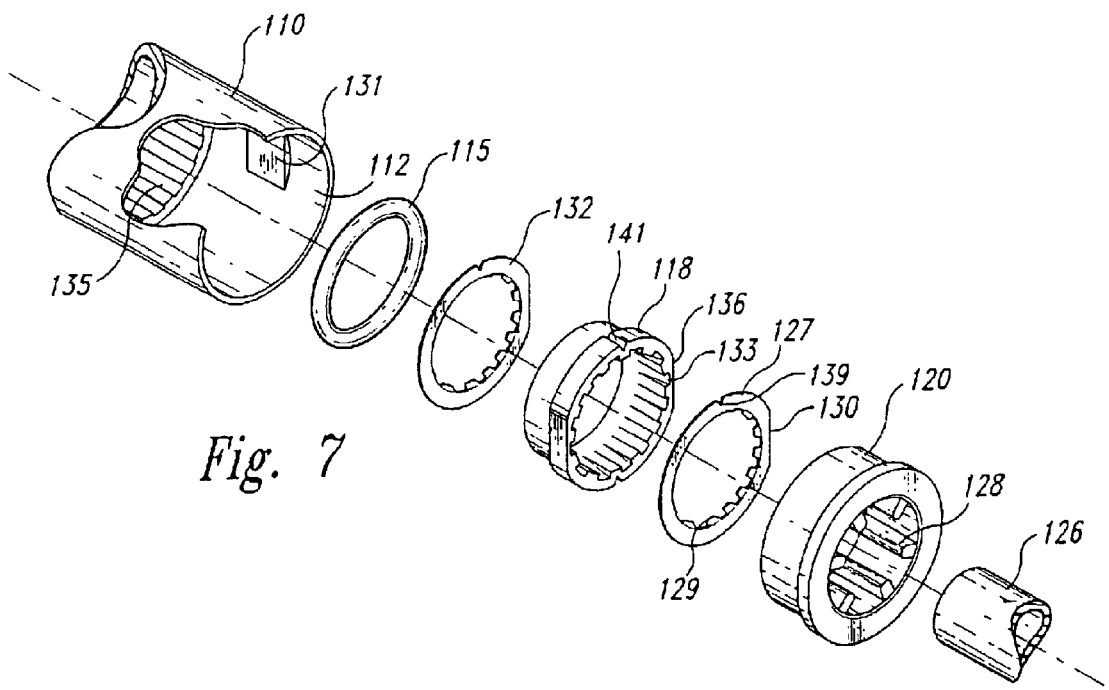
FIG. 7 is an exploded view of the coupling shown in FIG. 6.

In the couplings of FIGS. 6–11, the invention includes an outer housing 110 having an inner bore 112 with a side wall 114. The inner bore has a seal support surface 116 against which is fitted a conventional O-ring seal 115. The seal is held in the bore by a spacer bushing 118. The spacer bushing has circumferentially spaced axial grooves 133, as best shown in FIG. 7. A metallic gripper ring 127 is provided with circumferentially spaced axially and radially inwardly protruding teeth 129. A second identical gripper ring 132 is provided against the O-ring seal and thus on the opposite side of the spacer bushing 118. The spacer bushing has a flat 136 aligned with a flat 130 on the gripper rings 127, 132. The inside wall of the housing has a protruding flat 131 to receive the flats on the bushing and gripper rings. The gripper rings are also provided with a notch 139 and the spacer bushing provided with a notch 141, which notches engage a protrusion or key 140 (FIG. 6) on the inside wall 114 of the outer housing 110. The flats on the inner bushing and the gripper rings and the notches are provided to assure proper installation of the gripper rings and inner bushing within the housing.

An end bushing 120 is positioned against the gripper ring 127 and holds the O-ring, spacer bushing, and gripper rings tightly together so that the teeth of the gripper rings extend into the inner bore 112. The end bushing is held within the internal bore of the outer housing 110 by sonic welds 122 [FIG. 10]. The end bushing is provided with an inner bore 124 and protruding guide ribs 128 for guiding a plastic or copper tube 126 into the coupling. In the alternative, these ribs can be eliminated so that existing old repaired plumbing tubing with existing ferrules can be fitted into larger diameter of the end bushing 120 as in FIG. 13. The tube end inserted into the coupling is shown in FIG. 6. Inner ribs 135 [FIG. 7] are provided in the side wall 114 of the internal inner bore 112. In general, the gripper rings are made from a full hard stainless steel, the coupling parts from plastic, such as, acetal, or for larger couplings, metal, and the tubes or pipe made from copper, conventional PVC, polybutylene, PEX, or other metals and plastics used in plumbing.

As best shown in FIG. 6, the coupling is assembled by placing the O-ring against the ring support surface 116, the gripper ring 132 is placed against the O-ring, the spacer bushing is aligned with its flat 136 against the flat 131 of the outer housing and slid into place against the gripper ring 132, the gripper ring 127 is then placed against the opposite side of the spacer bushing with its flat 130 aligning the teeth 129 into the grooves 133 of the spacer bushing. Then the end bushing is placed within the outer housing and welded into place by sonic welding 122. For metal couplings, the outer housing can be secured by any suitable permanent attachment such as crimped or interfering threads. When a tube 126 is to be inserted in the coupling or the coupling inserted over a tube, the tube and the coupling are moved axially to one another with the tube engaging the teeth. The teeth of both rings extend into the inner bore of the housing a distance further than the outer diameter of the tube 126 so that the teeth are deflected by the tube as the tube and housing are moved axially to one another. This creates an immediate gripping engagement of the teeth even before any fluid pressure is applied in the coupling. The tube is inserted until it tightly engages the end wall 150 [FIG. 10] of the bore 112. This can be felt by the user of the coupling since the tube can be pushed to move axially, albeit tightly, until the end of the tube stops against the end wall 150 and cannot be pushed any further relative to the outer housing.

The O-ring seal maintains the fluid seal around the tube. The tube cannot be solely axially withdrawn by fluid pressure without destroying the coupling and will maintain quite a high fluid pressure. The tube can be removed by unscrewing the coupling relative to the tube, although with softer plastic tubing the teeth may dig into the tubing more deeply and the gouged surface of the tubing may be damaged when the coupling is unscrewed. In this case, a new tube may be needed or the damaged section of the original tube can be cut-off and the remaining undamaged end of the tubing can then be re-inserted into the coupling. The teeth 129 in the gripper rings can be manufactured with a slight twist or by using the full hard stainless steel or equivalent material, such as manganese, or composites, and a ring thickness of no greater than about 0.012 inches, preferably 0.008 inches, then the twist can be created by the forces acting on the teeth as the tube 126 is simultaneously rotated and pulled out of the housing. By rotating the tube while pulling, edges of the gripper teeth will move within the grooves 130 causing friction on one edge of the teeth allowing the teeth to twist and the tube screw out of the gripper ring.

In the embodiments shown, if the tube is initially not inserted past the gripper ring, or is not inserted through the O-ring seal, leakage will be apparent almost immediately when the pressure is applied to the plumbing system. Thus, an advantage of this embodiment is it gives an immediate visual check on the proper placement of the tube within the coupling or the position of the valve over the coupling.

Figure 8:
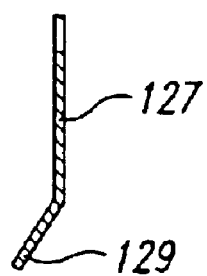
FIG. 8 is a fragmentary section of the gripper ring showing one of the gripper teeth.

FIG. 8 shows a typical gripper ring.

Figure 9:
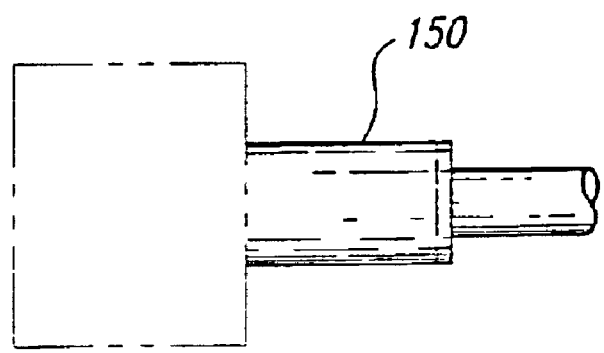
FIG. 9 is a generic illustration of uses for the coupling with what could be a valve, a shower head, a tub faucet coupling, a tube coupling, or any other application or use for this unique coupling.

FIG. 9 shows a phantom version of a coupling to illustrate that the coupling could be a valve, a coupling joining two tubes, a faucet coupling, a shower head, a test cap, or any other plumbing fixture using a push on coupling.

Figure 10:
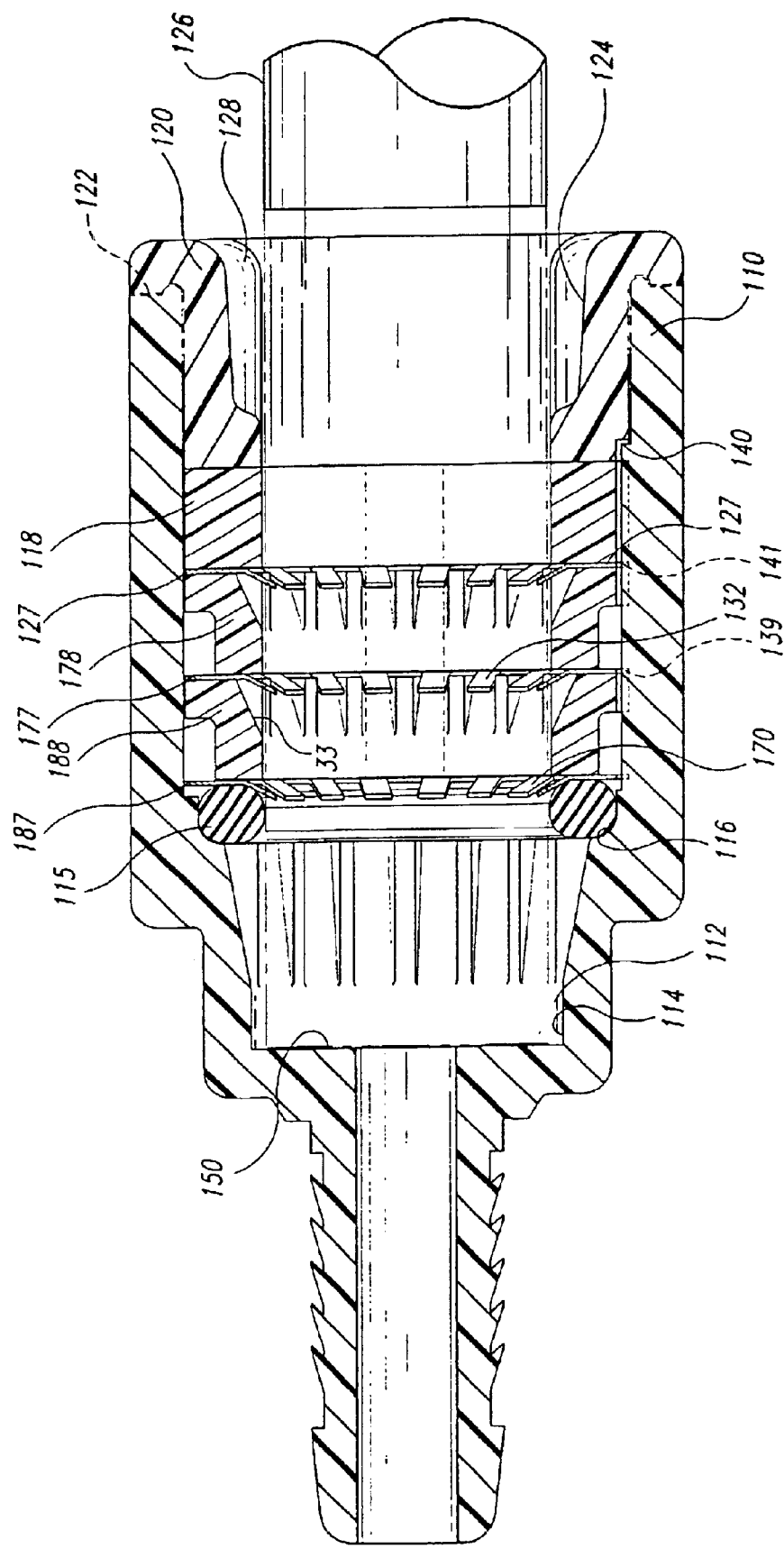
FIG. 10 shows another embodiment of the invention with three gripper rings. This view is intended to show that the number of gripper rings can be any multiple of two or more.

FIG. 10 shows another embodiment with the same features of the invention but with more gripper rings [three, namely, 127, 177, and 187 being shown] and more spacers 118, 178, and 188.

Figure 11:
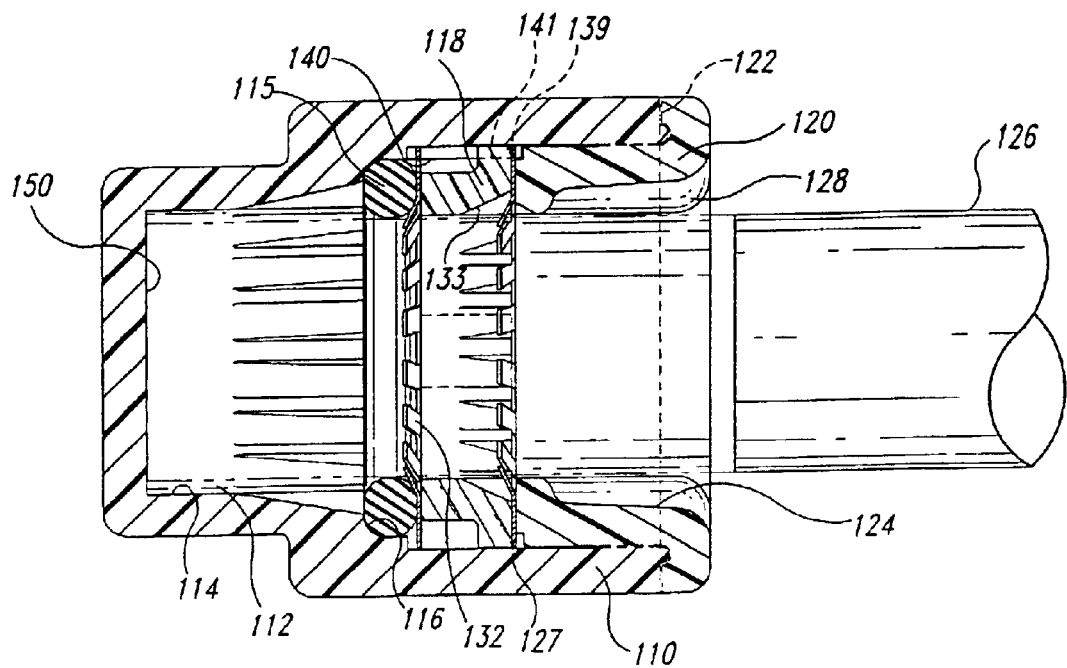
FIG. 11 shows still another embodiment of the coupling used for a test cap. These various views are intended to show that the coupling has a wide variety of uses and configurations not all of which are shown for purposes of brevity.

FIG. 11 shows an embodiment using the coupling as a test cap. A test cap is used in a plumbing system to see if all of the joints are free from leaks and that the proper pressure may be maintained. Usually then the test cap is removed and a permanent cap soldered or bonded onto the tube.

Figure 12:
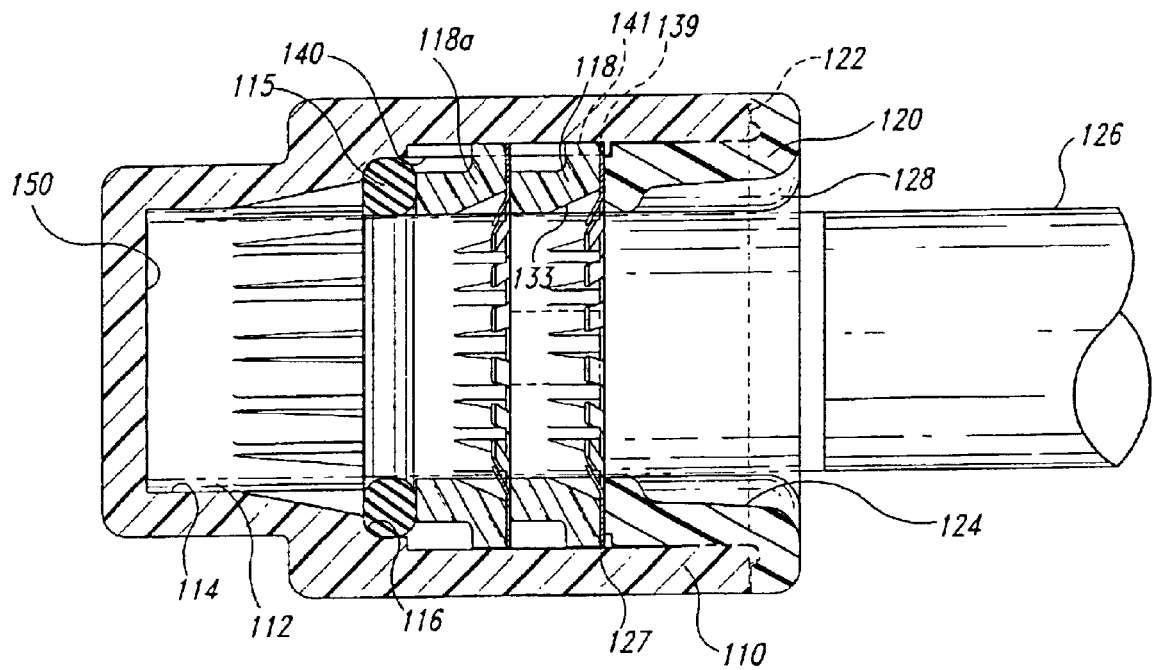
FIG. 12 shows another embodiment of the coupling.

FIG. 12 shows another embodiment similar to FIGS. 10 and 11 but with a spacer 118a placed between the o-ring and the gripper ring.

Figure 13:
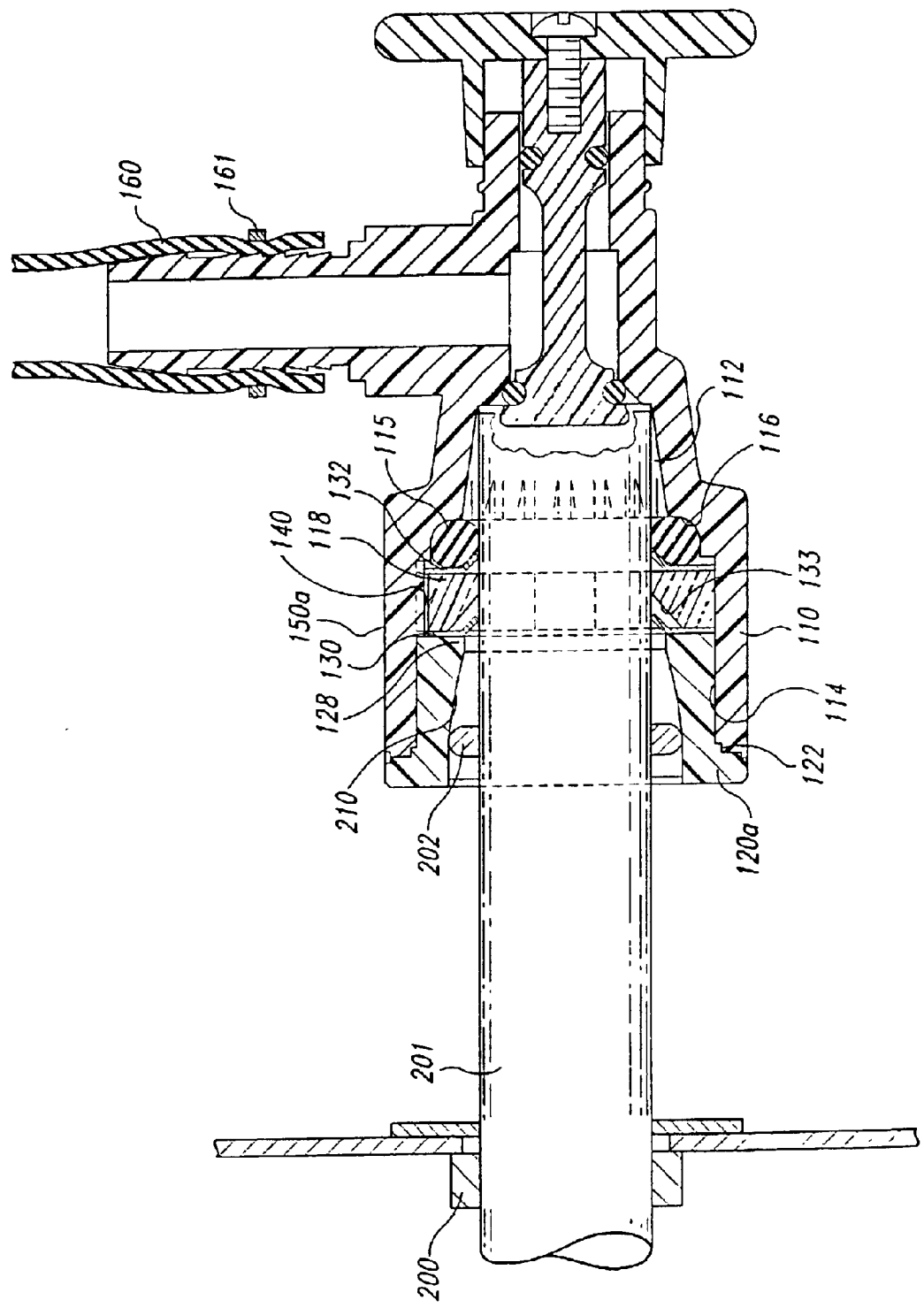
FIG. 13 shows another embodiment in which a valve using the push-on invention is used to replace a conventional metal valve with its normal compression ring.

FIG. 13 shows a valve having an O-ring seal 115 and one or more gripper rings, preferably two, such as, gripper rings 130 and 132. The end bushing in this embodiment is tapered internally as at 210 so that the metal compression ring 202 of a conventional metal threaded compression type valve fitting can fit into the taper 210 and allow the end of the pipe with the compression ring left intact on the pipe, pushed into the valve until it is past the O-ring seal and with the compression ring abutting the tapered surface of the end bushing. In this embodiment, the push-on valve of this invention replaces the conventional screw on compression fitted valve. The compression nut 200 from the old valve may be left on the pipe exposed or can be pushed back into the hole in the wallboard where it is hidden. The location of the O-ring axially inward of the gripper rings is advantageously employed in this re-piping embodiment because it allows the free end of the pipe of the replaced pipe fitting to be inserted far enough into the valve to pass inside the O-ring and be effectively sealed even though the end of the pipe may not reach the end of the internal bore 112 when the compression ring engages the tapered surface 210 of the end bushing. The gripper rings will, of course, hold the pipe in the valve and within the O-ring seal.

While two and three gripper rings have been shown in the drawing, any multiple of gripper rings can be used within the spacing of the coupling.

While the preferred embodiments have been illustrated and described, it should be apparent that variations will be apparent to one skilled in the art. Accordingly, the invention is not to be limited to the specific embodiments shown in the drawings.

What is claimed is:

1. A fluid conduit coupling for removably holding therein a tube having a compression ring thereon without removing the compression ring comprising:

an outer housing having an internal bore with a circumferential side wall, a seal support surface in said bore, a seal engaged in said support surface, at least one spacer bushing retaining said seal in said support surface, said spacer bushing having an axially inner side and an axially outer side, a gripper ring having radially and axially inwardly protruding circumferentially spaced gripper teeth having inner edges protruding inwardly into said internal bore, said gripper ring lying axially outward from said seal, and an end bushing attached to said outer housing to secure said spacer bushing in said internal bore, said end bushing having an axially outward recess sized to receive the compression ring therein.

2. The coupling of claim 1, said gripper ring lying against the axially inner side of the spacer bushing and against the seal.

3. The coupling of claim 1 including a second gripping ring lying against the axially outer side of said spacer brushing.

4. The coupling of claim 1 wherein said end bushing is welded to said outer housing.

5. The coupling of claim 1, wherein said recess of said end bushing has a inwardly tapering surface, whereby the compression ring is left intact on the tube and the tube is pushed into the coupling until the tube passes said seal and the compression ring abuts the inwardly tapering surface of said end bushing.

6. A fluid conduit coupling comprising:

an outer housing having an internal bore with a circumferential side wall, a seal in said bore, a spacer bushing having an axially inner side and an axially outer side, a first gripper ring having radially and axially inwardly protruding circumferentially spaced gripper teeth having inner edges protruding inwardly into said internal bore, said first gripper ring lying adjacent said axially inner side of said spacer bushing, said teeth protruding into said bore for holding a tube against axial movement, said first gripper ring mounted against rotation, a second gripper ring having radially and axially inwardly protruding circumferentially spaced gripper teeth having inner edges protruding inwardly into said internal bore, said second gripper ring lying adjacent said axially outer side of said spacer bushing, said teeth protruding into said bore for holding the tube against axial movement, said second gripper ring mounted against rotation, and said spacer bushing and first and second gripper rings being held in said internal bore.

7. The coupling of claim 6, further including another spacer bushing axially positioned between said seal and said first gripper ring, and retaining said seal in said internal bore.

8. A conduit coupling for removably holding a tube therein comprising:

an outer housing having an internal bore with a circumferential side wall;

a spacer bushing in said internal bore and having an axially inner side and an axially outer side; and a first gripper ring in said internal bore and having radially and axially inwardly protruding circumferentially spaced gripper teeth having inner edges protruding inwardly into said internal bore, said first gripper ring lying adjacent said axially outer side of said spacer bushing, said first gripper ring held in said outer housing to preclude rotational movement of said first gripper ring, said spacer bushing having circumferentially spaced grooves and said gripper teeth of said first gripper ring being aligned and fitted within said grooves.

9. The coupling of claim 8 further including a seal in said internal bore, said seal positioned axially inward of said spacer bushing.

10. The coupling of claim 9 wherein said axially inner side of said spacer bushing engages said seal.

11. The coupling of claim 9 further including a second gripper ring in said internal bore positioned axially inward of said spacer bushing and axially outward of said seal, said second gripper ring having radially inwardly protruding circumferentially spaced gripper teeth having inner edges protruding inwardly into said internal bore.

12. The coupling of claim 11, said second gripper ring lying against said axially inner side of said spacer bushing and adjacent said seal.

13. The coupling of claim 8 further including a second gripper ring in said internal bore lying adjacent said axially inner side of said spacer bushing, said second gripper ring having radially inwardly protruding circumferentially spaced gripper teeth having inner edges protruding inwardly into said internal bore.

14. The coupling of claim 8 further including a second gripper ring in said internal bore positioned axially inward of said first gripper ring, said first and second gripper rings having said spacer bushing therebetween, said second gripper ring having radially inwardly protruding circumferentially spaced gripper teeth having inner edges protruding inwardly into said internal bore.

15. The coupling of claim 8 further including a second gripper ring in said internal bore positioned axially outward of said first gripper ring with another spacer bushing therebetween, said second gripper ring having radially inwardly protruding circumferentially spaced gripper teeth having inner edges protruding inwardly into said internal bore.

16. The coupling of claim 15 wherein said another spacer bushing has circumferentially spaced grooves, and said gripper teeth of said second gripper ring are aligned and fitted within said grooves of said another spacer bushing.

17. The coupling of claim 15 further including a spacer positioned axially outward of said second gripper ring.

18. The coupling of claim 15 further including a third gripper ring in said internal bore positioned axially inward of said first gripper ring, said first and third gripper rings being separated by said spacer bushing, said third gripper ring having radially inwardly protruding circumferentially spaced gripper teeth having inner edges protruding inwardly into said internal bore.

19. The coupling of claim 18 further including a seal in said internal bore, said seal positioned axially inward of said third gripper ring.

20. The coupling of claim 8 further including an end bushing attached to said outer housing to secure said spacer bushing in said internal bore.

21. The coupling of claim 20 wherein said internal bore has circumferentially spaced inner ribs, and said end bushing has circumferentially spaced tube guide ribs.

22. The coupling of claim 20 wherein said end bushing is attached to said outer housing by a weld.

23. The coupling of claim 8 wherein said first gripper ring has a flat on its circumference, said spacer bushing has a flat on its circumference, and said flats engage a mating flat protrusion in said internal bore of said outer housing.

24. The coupling of claim 8 wherein said gripper teeth of said first gripper ring are sufficiently flexible to twist when subjected to simultaneous axial outward directed and rotational force to allow the unscrewing and removal of the tube inserted into the coupling.

25. The coupling of claim 8 wherein said gripper teeth of said first gripper ring have a permanent twist to allow the unscrewing and removal of the tube inserted into the coupling.

26. The coupling of claim 8 wherein said grooves cause friction on one edge of said gripper teeth allowing said gripper teeth to twist and the tube inserted into the coupling to be unscrewed and removed from the coupling.

27. The coupling of claim 8 for use with a tube having a compression ring thereon without removing the compression ring, further including an end bushing attached to said outer housing to secure said spacer bushing in said internal bore, said end bushing having an axially outward recess sized to receive the compression ring therein.

28. The coupling of claim 27 said recess of said end bushing has an inwardly tapered surface.

29. The coupling of claim 27 further including a seal in said internal bore, said seal positioned axially inward of said spacer bushing.

30. The coupling of claim 29 further including a second gripper ring in said internal bore positioned axially inward of said spacer bushing and axially outward of said seal, said second gripper ring having radially inwardly protruding circumferentially spaced gripper teeth having inner edges protruding inwardly into said internal bore.

31. The coupling of claim 30, said second gripper ring lying against said axially inner side of said spacer bushing and adjacent said seal.

32. The coupling of claim 8 wherein said teeth having a twist when subjected to an axial outwardly directed and rotational force for allowing the unscrewing and removal of a tube inserted in said coupling.

33. The coupling of claim 8 wherein said spacer bushing is held in said outer housing to preclude rotational movement of said spacer bushing.

* * * * *

UNITED STATES PATENT AND TRADEMARK OFFICE
CERTIFICATE OF CORRECTION

PATENT NO. : 6,860,523 B2  
APPLICATION NO. : 10/266935  
DATED : March 1, 2005  
INVENTOR(S) : Jerry E. O'Neill and Charlie Whitney It is certified that error appears in the above-identified patent and that said Letters Patent is hereby corrected as shown below:

Title page, replace item 63 with the following: Continuation of application No. 09/570,846, filed on May 12, 2000, now Pat. No. 6,464,266, which is a continuation-in-part of application No. 09/216,376, filed on Dec. 18, 1998, now abandoned, and a continuation-in-part of application No. 09/425,909, filed on Oct. 21, 1999, now abandoned, and claims the benefit of PCT/US99/30149, filed on Dec. 17, 1999.

Signed and Sealed this

Seventh Day of December, 2010

David J. Kappos  
*Director of the United States Patent and Trademark Office*